United States Patent [19]

Kondo

[11] Patent Number: 5,351,190
[45] Date of Patent: Sep. 27, 1994

[54] COMMUNICATION APPARATUS AND METHOD ESTABLISHING A LANGUAGE DEPENDENT SORT ORDER SEARCH

[75] Inventor: Masaya Kondo, Tokyo, Japan

[73] Assignee: Canon Kabushiki Kaisha, Tokyo, Japan

[21] Appl. No.: 774,244

[22] Filed: Oct. 10, 1991

[30] Foreign Application Priority Data

Oct. 17, 1990 [JP] Japan ................... 2-279709

[51] Int. Cl.⁵ ............................................ G06F 15/38
[52] U.S. Cl. ........................ 364/419.08; 364/419.16; 364/419.19
[58] Field of Search ............... 364/419, 419.08, 419.1, 364/419.11, 419.13, 419.16, 419.19

[56] References Cited

U.S. PATENT DOCUMENTS

| 4,908,853 | 3/1990 | Matsumoto | 379/355 |
| 5,034,976 | 7/1991 | Sato | 379/113 |
| 5,072,386 | 12/1991 | Garneau et al. | 364/419 |
| 5,077,669 | 12/1991 | Garneau et al. | 364/419 |
| 5,148,541 | 9/1992 | Lee et al. | 395/600 |
| 5,157,514 | 10/1992 | Yoshioka | 358/407 |

FOREIGN PATENT DOCUMENTS

| 0310283 | 4/1989 | European Pat. Off. |
| 2494063 | 5/1982 | Fed. Rep. of Germany |
| 57-101983 | 6/1982 | Japan |
| 61-062163 | 3/1986 | Japan |
| 1060055 | 3/1989 | Japan |

Primary Examiner—Robert A. Weinhardt
Assistant Examiner—A. Bodendorf
Attorney, Agent, or Firm—Fitzpatrick, Cella, Harper & Scinto

[57] ABSTRACT

A communication apparatus comprises a memory for storing telephone numbers of a plurality of communication destinations together with destination data including character information such as abbreviations; a search unit for searching the destination data stored in the memory; a selection unit for selecting a language; and a set unit for setting an order of search for the destination data by the search unit in accordance with the language selected by the selection unit.

9 Claims, 6 Drawing Sheets

| CHARACTER | CHARACTER CODE FOR TABLE A | CHARACTER CODE FOR TABLE B | CHARACTER CODE FOR TABLE C |
|---|---|---|---|
| A | 0 1 | 0 1 | 0 1 |
| B | 0 2 | 0 3 | 0 2 |
| C | 0 3 | 0 4 | 0 3 |
| D | 0 4 | 0 5 | 0 4 |
| E | 0 5 | 0 6 | 0 5 |
| ⋮ | ⋮ | ⋮ | ⋮ |
| X | 2 4 | 2 5 | 2 4 |
| Y | 2 5 | 2 6 | 2 5 |
| Z | 2 6 | 2 7 | 2 6 |
| Å | 1 0 1 | 1 0 1 | 2 7 |
| Á | 1 0 2 | 1 0 2 | 1 0 1 |
| À | 1 0 3 | 1 0 3 | 1 0 2 |
| Ä | 1 0 4 | 0 2 | 2 8 |
| ⋮ | ⋮ | ⋮ | ⋮ |

TBALE A     TBALE B     TBALE C

FIG. 4

| ABBREV. NAME OF PERTNER STATION | TYPE A (ENGLISH) | TYPE B (GERMAN) | TYPE C (FINNISH) |
|---|---|---|---|
| AACHER | AACHER | AACHER | AACHER |
| ABER | ABER | ABER | ABER |
| ÄBER | ANFOR | ÄBER | ANFOR |
| ÅBER | BELRIZ | ANFOR | BELRIZ |
| ÀBER | ZEEP | ÄNFOR | ZEEP |
| ÁCOP | ÅBER | BELRIZ | ÅBER |
| ANFOR | ÁBER | ZEEP | ÄBER |
| ÄNFOR | ÄBER | ÅBER | ÄNFOR |
| ÅNFOR | ÀCOUP | ÁBER | ÀNFOR |
| BELRIZ | ANFOR | ÀCOUP | ÁBER |
| ZEEP | ÄNFOR | ÅNFOR | ÀCOUP |

FIG. 5

ENGLISH

ALPHABET: A B C D E F G H I J K L M N O P Q R S T U V W X Y Z

OTHERS: Å Á À Ä É È Ê Ë Í Ì Î Ï Ó Ò Ö Ú Ù Ü

GERMAN

ALPHABET: A Ä B C D E Ë F G H I Ï J K L M N O Ö P O R S T U Ü V W X Y Z

OTHERS: Å Á À É È Ê Í Ì Î Ó Ò Ú Ù

FINNISH

ALPHABET: A B C D E F G H I J K L M N O P O R S T U V W X Y Z Å Ä Ö

OTHERS: Á À É È Ê Í Ì Ó Ò Ú Ù Ü

FIG. 6

COMMUNICATION APPARATUS AND METHOD ESTABLISHING A LANGUAGE DEPENDENT SORT ORDER SEARCH

BACKGROUND OF THE INVENTION

1. Field of the Invention

The present invention relates to a communication apparatus having an electronic telephone book function for searching a destination station by destination information such as destination abbreviation.

2. Related Background Art

In a prior art communication apparatus having an electronic telephone book function for searching an abbreviation of a destination station, an order of search for the abbreviation search is fixed without regard to the language. Patent applications for such a communication apparatus includes U.S. Pat. No. 4,908,853 (issued on Mar. 13, 1990) and U.S. Pat. No. 5,034,976 (issued on Jul. 23, 1991).

However, in the prior art apparatus, since the order of search for the abbreviation search is fixed regardless of the language, the abbreviation search may be difficult for some language when a plurality of types of languages are used for the abbreviation search.

SUMMARY OF THE INVENTION

It is an object of the present invention to improve a communication apparatus in the light of the above.

It is another object of the present invention to provide a communication apparatus having an electronic telephone book function which enables the abbreviation search by a plurality of types of languages and enables the abbreviation searches adapted to the respective languages.

Other objects of the present invention will be apparent from the following detailed description of the embodiments and the drawings.

DETAILED DESCRIPTION OF THE PREFERRED EMBODIMENTS

One embodiment of the present invention is now explained in detail with reference to the drawings.

In the following embodiment, a facsimile apparatus is discussed as an example of the communication apparatus having the electronic telephone book function although the present invention is not limited to the facsimile apparatus but is applicable to various communication apparatus such as a telephone set.

Figure 1:
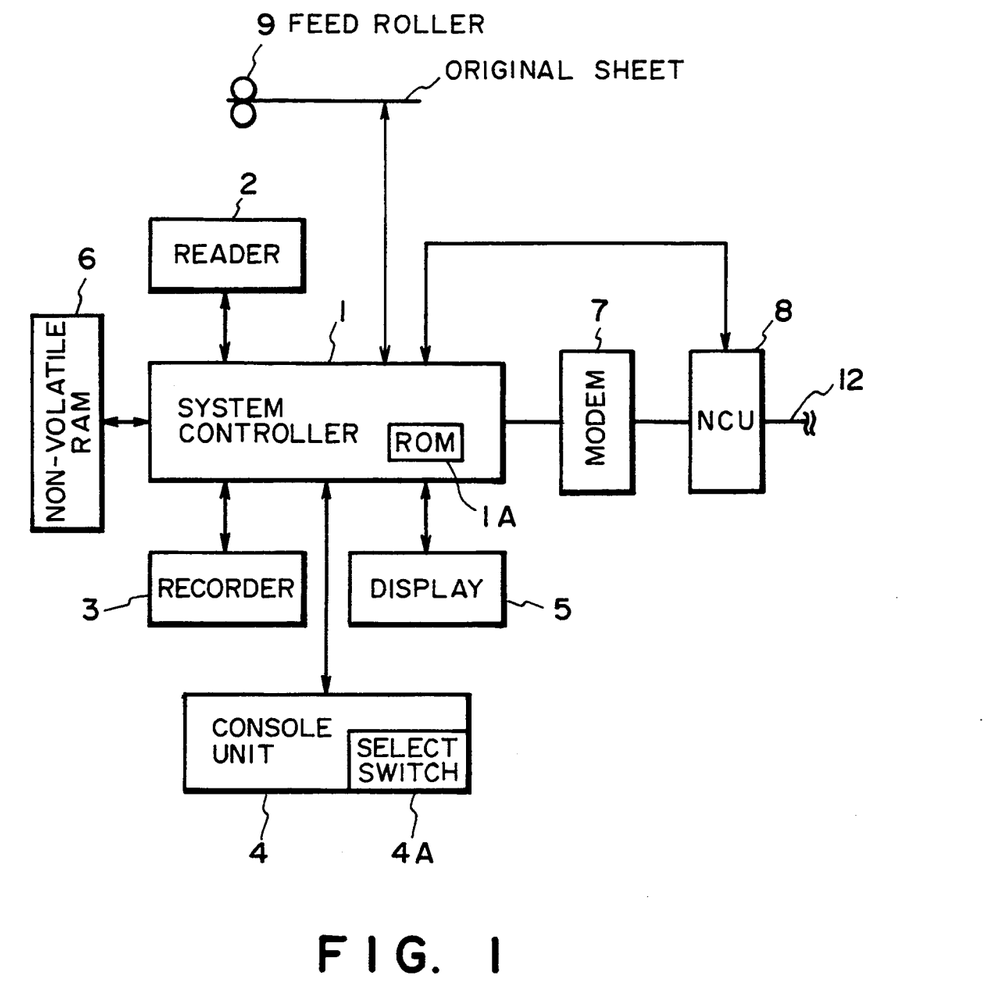
FIG. 1 shows a block diagram of a configuration of a facsimile apparatus in accordance with one embodiment of the present invention.

FIG. 1 shows a block diagram of a configuration of the facsimile apparatus of the embodiment.

Figure 2:
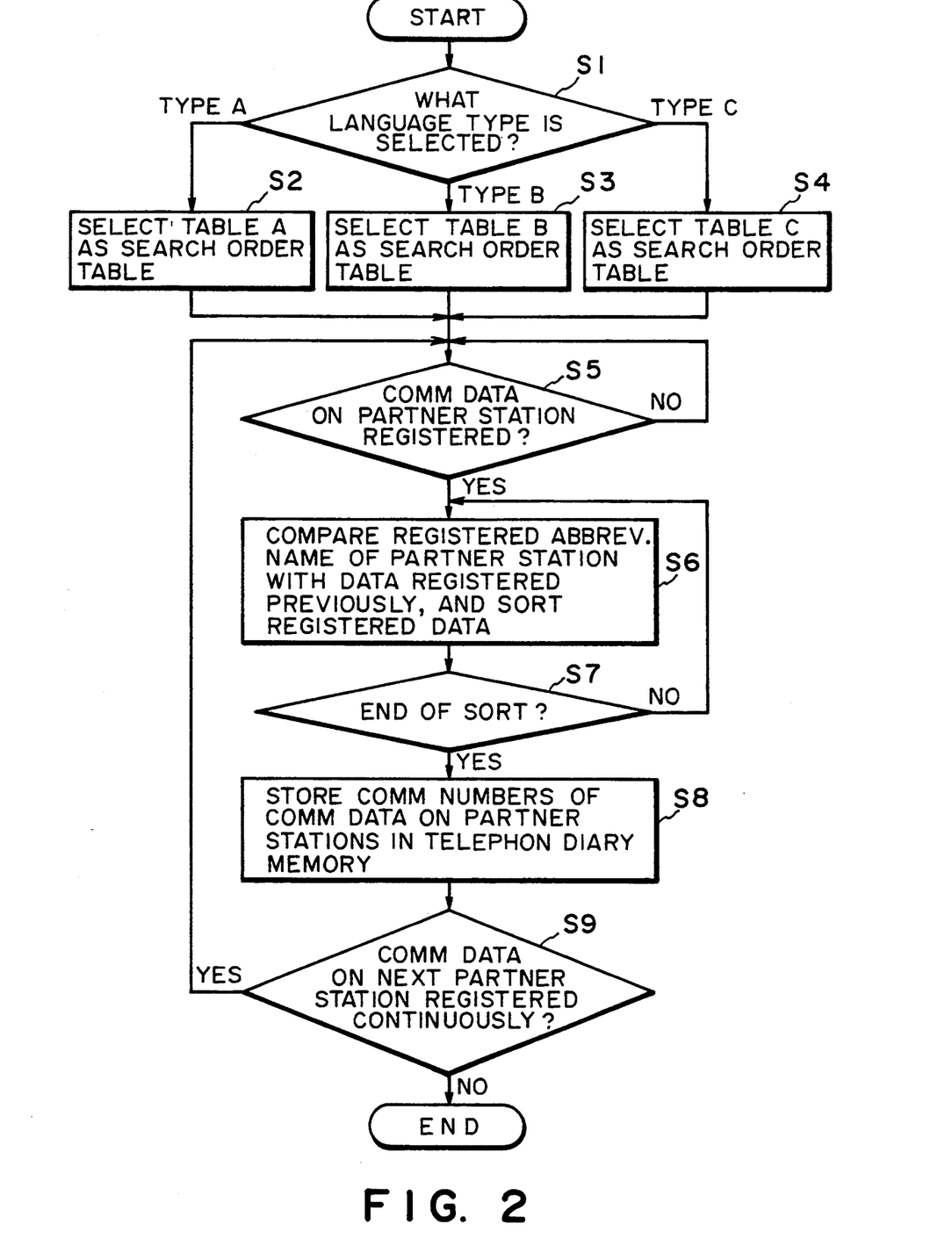
FIGS. 2 and 3 show flow charts of control operations of a system control unit of the embodiment.

In FIG. 1, numeral 1 denotes a system control unit which controls elements to be described later. The system control unit 1 comprises a computer and a memory. It also includes a read-only memory. (ROM) 1A which contains a control procedure as shown in FIG. 2.

Numeral 2 denotes a reader which may comprise a CCD image sensor for reading a transmitting document 11 fed by a document feed roller 9.

Numeral 3 denotes a recorder for electrostatically recording an image in accordance with a received image signal. Numeral 4 denotes a console unit having various keys arranged thereon, and numeral 4A denotes a selection switch for selecting a language for a message. Numeral 5 denotes a display for displaying a status and an alarm. The console unit 4 and the display 5 may be constructed as a Single console unit.

Numeral 6 denotes a non-volatile RAM for storing communication destination data. The RAM 6 may be a random access memory which is backed up by a battery. Numeral 7 denotes a modem.

Numeral 8 denotes a network control unit (NCU) having a capability to send out a selection signal (pulse and tone dialer). It conducts automatic reception operation by detecting a calling signal and line control and also sends out the selection signal to a telephone line 12 under the control of the system control unit 1.

An operation of the present embodiment is now explained with reference to a flow chart of FIG. 2. In a step S1, a type of language is selected. In the present embodiment, one of three types A, B and C is selected although the number of types is not limited to three. In the present embodiment, the type A corresponds to English, the type B corresponds to German and the type C corresponds to Finnish, although they are not limited to those specific languages. One of tables A to C of FIG. 4 corresponding to the language selected in the step S1 is set in a search order table (steps S2~S4).

Figure 3:
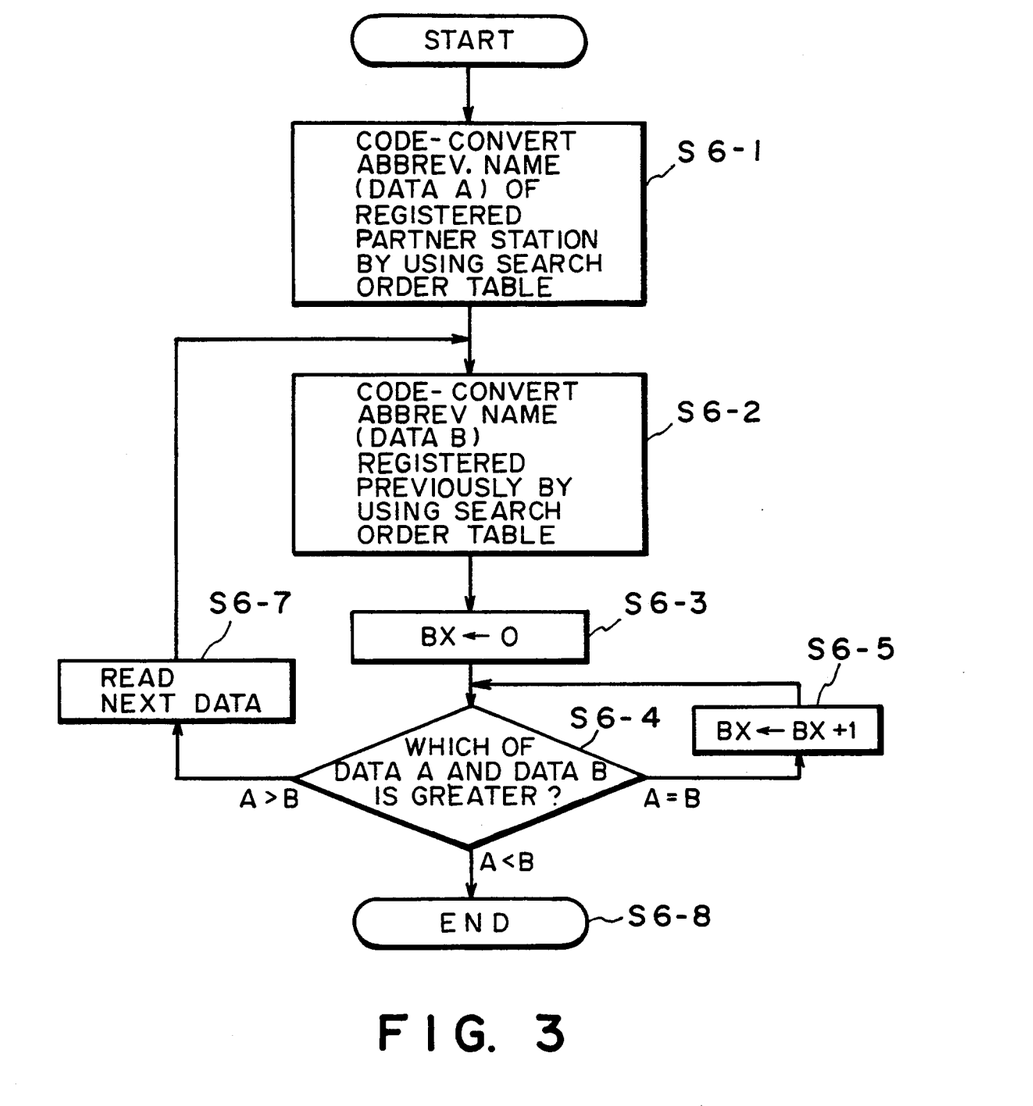
Figure 4:
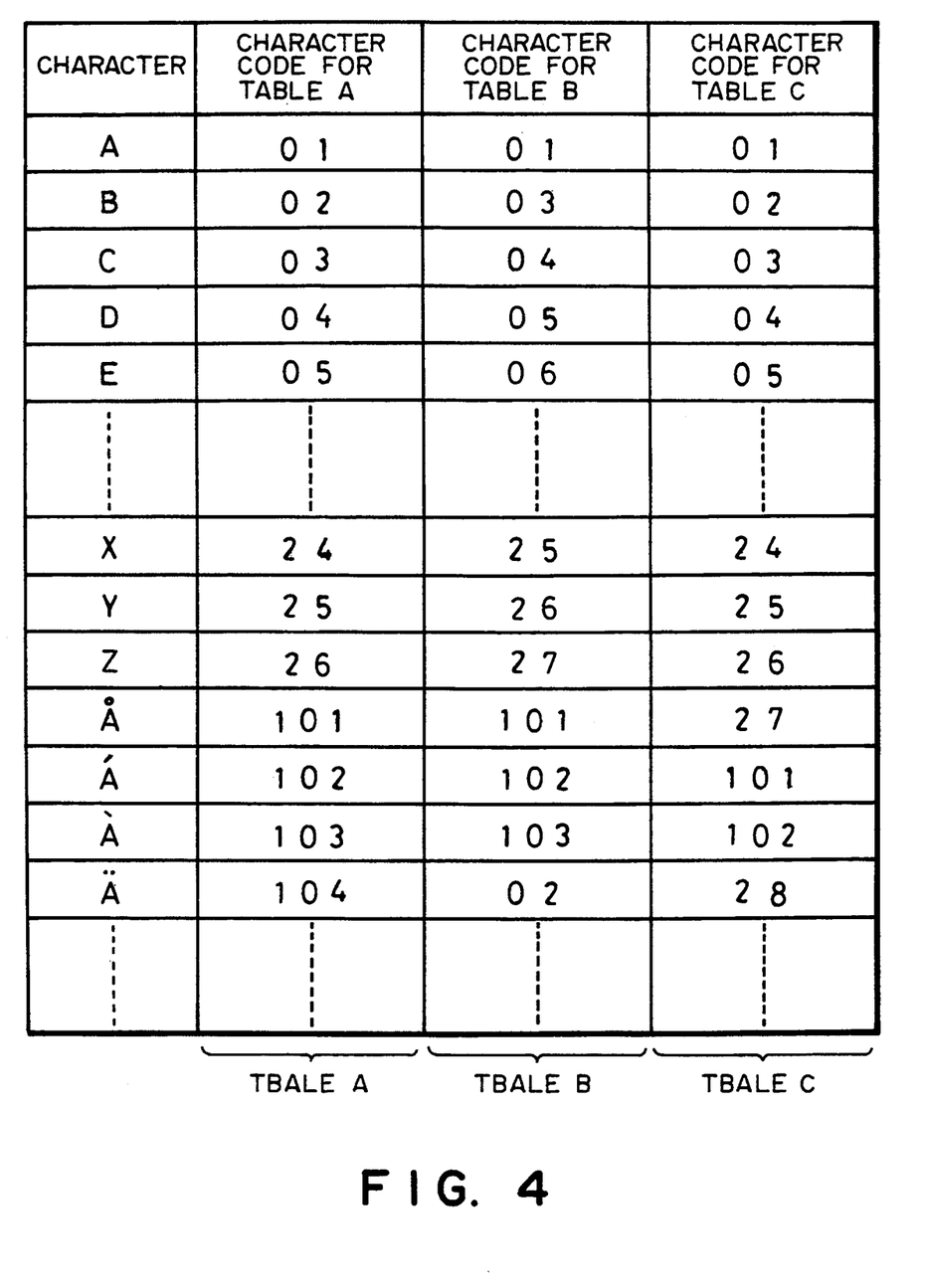
FIG. 4 shows a portion of a search order table used in the embodiment.

If destination communication data is registered in a step S5, the process proceeds to a step S6 wherein a registered destination abbreviation and existing destination abbreviations are compared, and rearranged. In the rearrangement, the sequence of existing destination abbreviations in non-volatile memory 6 (i.e., those already sorted) are compared to a registered destination abbreviation (i.e., a destination abbreviation being inserted in the sequence of existing destination abbreviations) so that the registered destination abbreviation is placed in order in the sequence of existing destination abbreviations. The rearrangement is explained with reference to a flow chart of FIG. 3. In a step S6-1, the registered destination abbreviation (data A) is code-converted by using the search order table. FIG. 4 illustrates a portion of a search table. In FIG. 4, each character has a corresponding code in tables A, B and C to which the character is converted and the codes are arranged in ascending order. The character order, however, depends on language. For example, the character "Ä" in table A (e.g., English) is converted into a "104" code since the character is not used. In a different language (e.g., German), the same character is converted to an "02" code since it is the second character in the German alphabet. In a still different language (e.g.. Finnish), the character "Ä" is converted into a ¢28" code corresponding its place in the Finnish alphabet. The data converted by the search order table is rearranged in an ascending order of search. Namely, when data are compared, one having a smaller code is searched first. In a step S6-2, the previously registered destination abbreviations (data B) are read from the non-volatile RAM 6 and they are code-converted by using the search order table shown in FIG. 4. Then, the character strings of the data A corresponding to an abbreviation being registered and the data B corresponding to an abbreviation previously registered and in non-volatile memory 6 are compared. A signal BX which represents a digit of the character string to be compared is initialized (step S6-3), first characters of the data A and the data B are compared (step S6-4), and if the data A is smaller, the comparison is terminated (step S6-8). If the data B is larger, the next one of the previously registered data is read from the non-volatile RAM (step S6-7) and the process moves to the step S6-2. The previously registered data is compared with the registered data in the order of search. If the data A and the data B compared are identical, the content of the BX is incremented (step S6-5), and the next digits are compared. Turning back to the flow chart of FIG. 2, when the comparison is made and the data is rearranged, the process proceeds from the step S7 to a step S8 in which the order is stored in the non-volatile RAM 6. In a step S9, the presence or absence of the registration of the next data is determined, and if there is the registration of the next data, the process proceeds to the step S5, and if there is no registration of the next data, the process is terminated.

Figure 5:
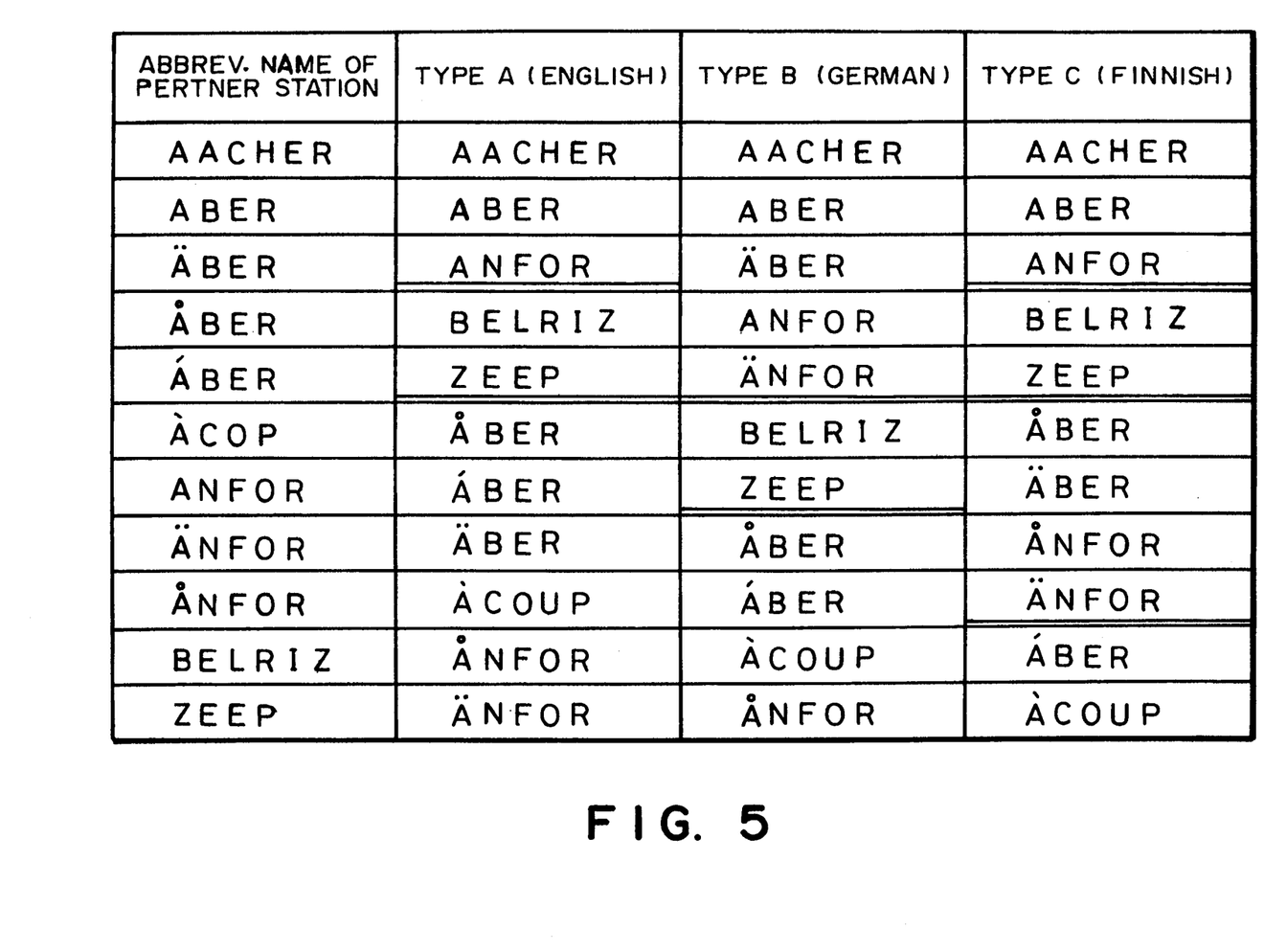
FIG. 5 illustrates an abbreviation search in the embodiment.
Figure 6:
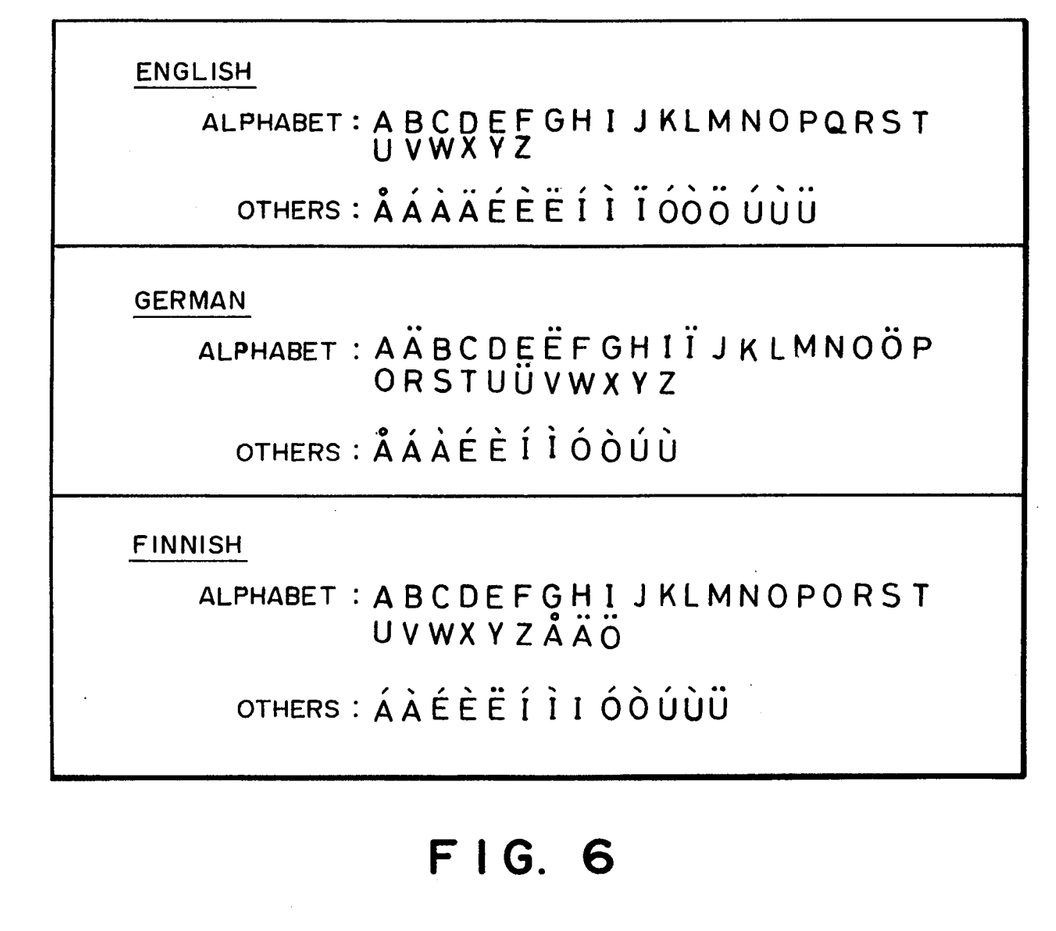
FIG. 6 shows a character priority order for three languages used in the embodiment.

One example is explained below. FIG. 5 shows orders of search for the types of language (type A: English, type B: German, type C: Finnish) for the input destination abbreviation data. When English is selected as the type of language, special characters for the language such as ÅA, Á, À and Ä are not used in English and they are treated as "others" than alphabet characters. When German is selected as the type of language, "Ä" which is treated likely to an alphabet character "A" in German is sorted into a column A, and the characters ÅA, À and Á which are not used in German are treated as "others". When Finnish is selected, characters ÅA and Ä are used but they are treated differently from those in German. In Finnish, the character ÅA or Å is located after "Z". The characters Á and À which are not used in Finnish are treated as "others" as they are in English. Such a character priority order is shown in FIG. 6. By using the search order table of FIG. 4, the abbreviation search may be conducted in the order determined by the selected language as shown in FIG. 5.

The number of selections of the types of language in the step S1 of FIG. 2 is not limited to the one described in the present embodiment.

Further, the languages selected by the selection of the type of language are not limited to those described above.

The format of the table and the character format shown in FIG. 4 are not limited to those shown in FIG. 4.

In the present embodiment, the destination abbreviations are rearranged when the destination communication data is registered, although the destination abbreviations may be rearranged when the abbreviation is searched.

The present invention is not limited to the above embodiment but various modifications thereof may be made.

What is claimed is:

1. A search apparatus comprising:
   first memory means for storing telephone numbers of a plurality of communication destinations together with destination data including character information such as a destination name;
   second memory means for storing a plurality of separate orders of search characters, each separate order corresponding to a different one of a plurality of languages;
   selection means for selecting one of the plurality of languages; and
   search means for searching the destination data stored in said first memory in accordance with the order of search characters stored in said second memory means regarding the one of the plurality of languages selected by said selection means.

2. A search apparatus according to claim 1 wherein said search means arranges the destination data stored in advance and destination data newly stored in accordance with the selected language.

3. A search apparatus comprising:
   first memory means for storing data of a plurality of communication destinations including character information;
   second memory means for storing a plurality of separate orders of search characters, each separate order corresponding to a different one of a plurality of languages;
   selection means for selecting one of the plurality of languages; and
   search means for searching the plurality of communication destinations stored in said first memory means in accordance with the order of search characters stored in said second memory means regarding the selected one of the plurality of languages.

4. A search apparatus according to claim 3 wherein said search means arranges the communication destinations stored in advance and the communication destinations newly stored.

5. A search apparatus having an electronic book function with registered character information data, comprising:
   memory means for storing a plurality of separate orders of search characters, each separate order corresponding to a different one of a plurality of languages;
   selection means for selecting one of the plurality of languages; and
   search means for searching the registered character information in accordance with the order of search characters stored in the memory means regarding the one of the plurality of languages selected by said selection means.

6. A search apparatus according to claim 5 wherein said search means arranges the character information registered in advance and newly stored character information.

7. A method of searching a plurality of registered data including character information, comprising the steps of:
   storing a plurality of separate orders of search characters, each separate order corresponding to a different one of a plurality of languages;
   selecting one of the plurality of languages; and
   searching the plurality of registered data in accordance with the order of search characters regarding the selected one of the plurality of languages.

8. A method according to claim 7, wherein in said searching step the plurality of data registered in advance and newly added data are arranged.

9. A method according to claim 7, wherein the plurality of registered data includes communication destination data.

* * * * *

UNITED STATES PATENT AND TRADEMARK OFFICE
CERTIFICATE OF CORRECTION

PATENT NO. : 5,351,190

DATED : September 27, 1994

INVENTOR : MASAYA KONDO

It is certified that error appears in the above-identified patent and that said Letters Patent is hereby corrected as shown below:

ON THE TITLE PAGE

Under "FOREIGN PATENT DOCUMENTS"

"2494063 5/1982 Fed. Rep. of Germany ." should read
--2494063 5/1982 France-- and,
"1060055 3/1989 Japan ." should read
--1-60055 3/1989 Japan.--.

SHEET 2 OF 6

FIG. 2, "TELEPHON," should read --TELEPHONE--.

SHEET 4 OF 6

FIG. 4, "TBALE A" should read --TABLE A--
"TBALE B" should read --TABLE B-- and,
"TBALE C" should read --TABLE C--.

SHEET 5 OF 6

FIG. 5, "PERTNER" should read --PARTNER--.

COLUMN 1

Line 18, "includes" should read --include--.

UNITED STATES PATENT AND TRADEMARK OFFICE
CERTIFICATE OF CORRECTION

PATENT NO.  :  5,351,190

DATED       :  September 27, 1994

INVENTOR    :  MASAYA KONDO

It is certified that error appears in the above-identified patent and that said Letters Patent is hereby corrected as shown below:

COLUMN 2

Line 1, "memory." should read --memory--.
Line 13, "Single" should read --single--.
Line 60, "¢28"" should read --"28"--.
Line 61, "corresponding its" should read --corresponding to its--.

COLUMN 3

Line 30, "ÅA", should read --Å,--.
Line 33, "likely" should read --similar--.
Line 35, "ÅA," should read --Å--.

Line 36, "ÅA" should read --Å--.
Line 38, "ÅA" should read --Å--.

UNITED STATES PATENT AND TRADEMARK OFFICE
CERTIFICATE OF CORRECTION

PATENT NO. : 5,351,190

DATED : September 27, 1994

INVENTOR : MASAYA KONDO

It is certified that error appears in the above-identified patent and that said Letters Patent is hereby corrected as shown below:

COLUMN 4

Line 12, "claim 1" should read --claim 1,--.
Line 30, "claim 3" should read --claim 3,--.
Line 48, "claim 5" should read --claim 5,--.

Signed and Sealed this

Twenty-third Day of May, 1995

Attest:

Attesting Officer

BRUCE LEHMAN

Commissioner of Patents and Trademarks